United States Patent
Jorgens et al.

(10) Patent No.: US 8,045,553 B2
(45) Date of Patent: Oct. 25, 2011

(54) PROCESSING, FORMING, MODIFYING, AND COMPARING PACKET DATA STRUCTURES

(75) Inventors: Bruce T. Jorgens, Spokane, WA (US); Brian R. Town, Spokane, WA (US)

(73) Assignee: Ciena Corporation, Linthicum, MD (US)

( * ) Notice: Subject to any disclaimer, the term of this patent is extended or adjusted under 35 U.S.C. 154(b) by 470 days.

(21) Appl. No.: 12/185,629

(22) Filed: Aug. 4, 2008

(65) Prior Publication Data

US 2010/0027536 A1     Feb. 4, 2010

(51) Int. Cl.
*H04L 12/28* (2006.01)
*H04L 12/56* (2006.01)
(52) U.S. Cl. ........................................ 370/389
(58) Field of Classification Search .................. None
See application file for complete search history.

(56) References Cited

U.S. PATENT DOCUMENTS

| | | | | |
|---|---|---|---|---|
| 6,128,666 A | * | 10/2000 | Muller et al. | 709/238 |
| 6,694,344 B1 | * | 2/2004 | Gerwig et al. | 708/532 |
| 2003/0088700 A1 | * | 5/2003 | Aiken | 709/245 |
| 2004/0105440 A1 | * | 6/2004 | Strachan et al. | 370/389 |
| 2006/0098644 A1 | * | 5/2006 | Pullela et al. | 370/389 |
| 2006/0182146 A1 | * | 8/2006 | Monette et al. | 370/473 |
| 2007/0171918 A1 | * | 7/2007 | Ota et al. | 370/395.53 |

* cited by examiner

*Primary Examiner* — Chirag Shah
*Assistant Examiner* — Minh-Trang Nguyen
(74) *Attorney, Agent, or Firm* — Clements Bernard PLLC; Christopher L. Bernard; Lawrence A. Baratta Jr.

(57) ABSTRACT

Packet data structure formation methods include receiving a request to create a data structure for representing a packet. The request may refer to two or more fields to be included in the packet. The methods further include determining bit values and packet positions associated with the fields and, based on the determining, creating a set of bits comprising the packet. The set of bits include the bit values in the packet positions. The method further includes storing the set of bits using the data structure.

27 Claims, 8 Drawing Sheets

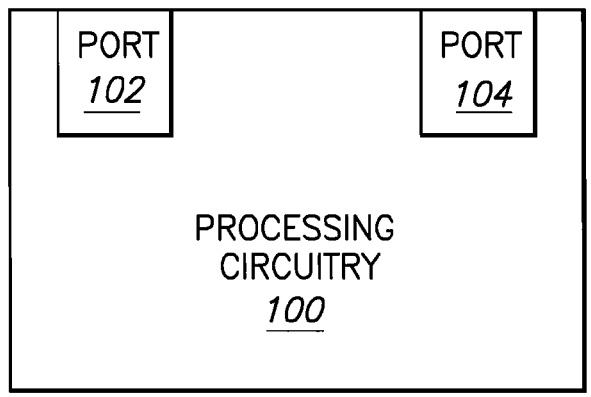
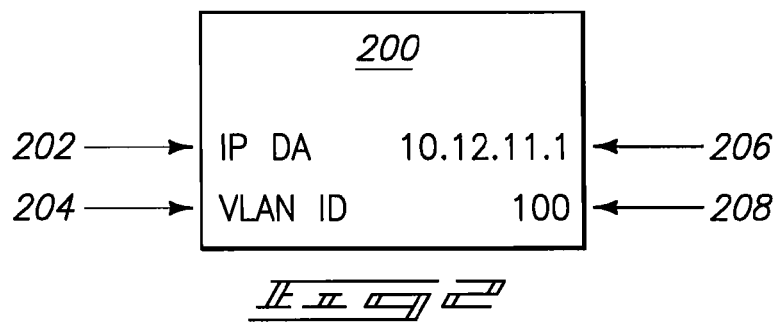
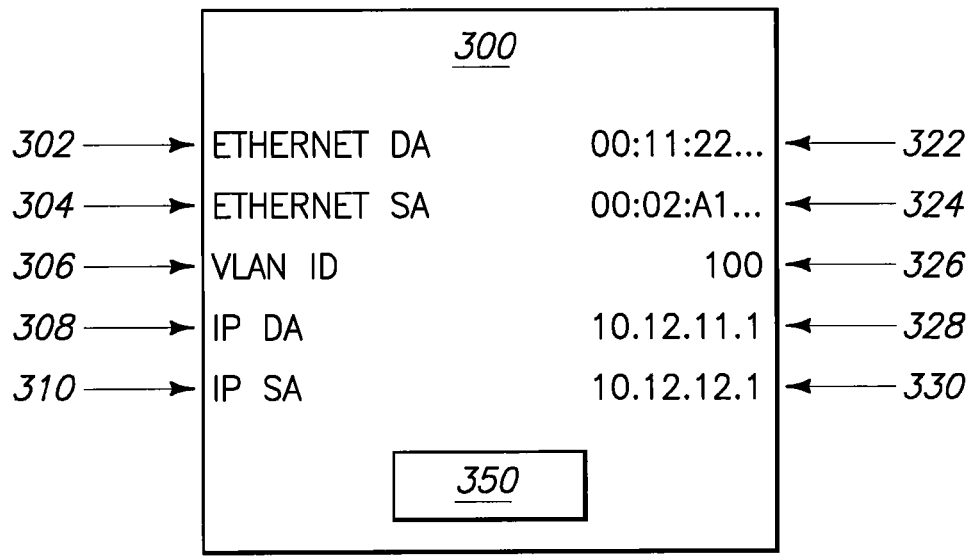

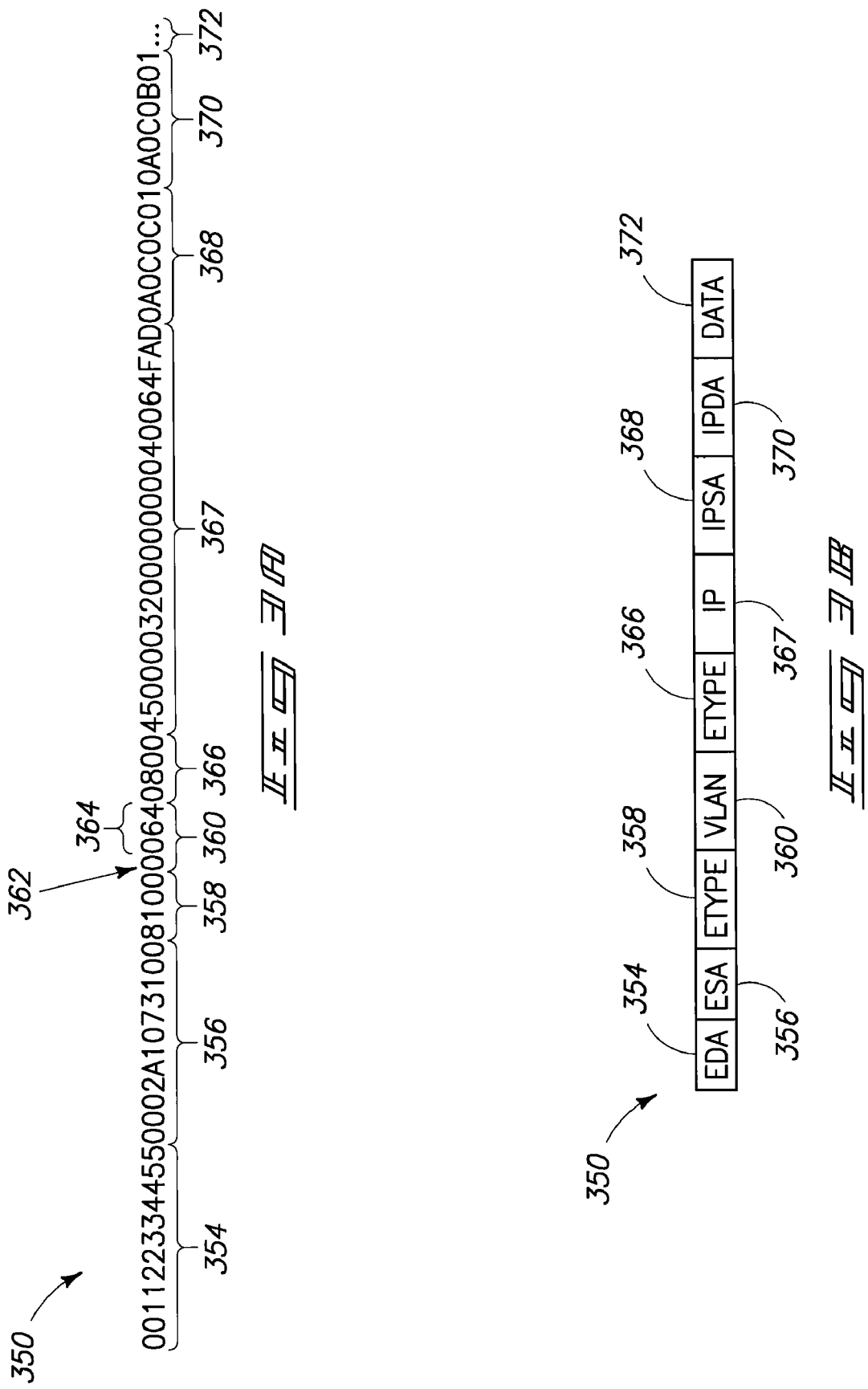

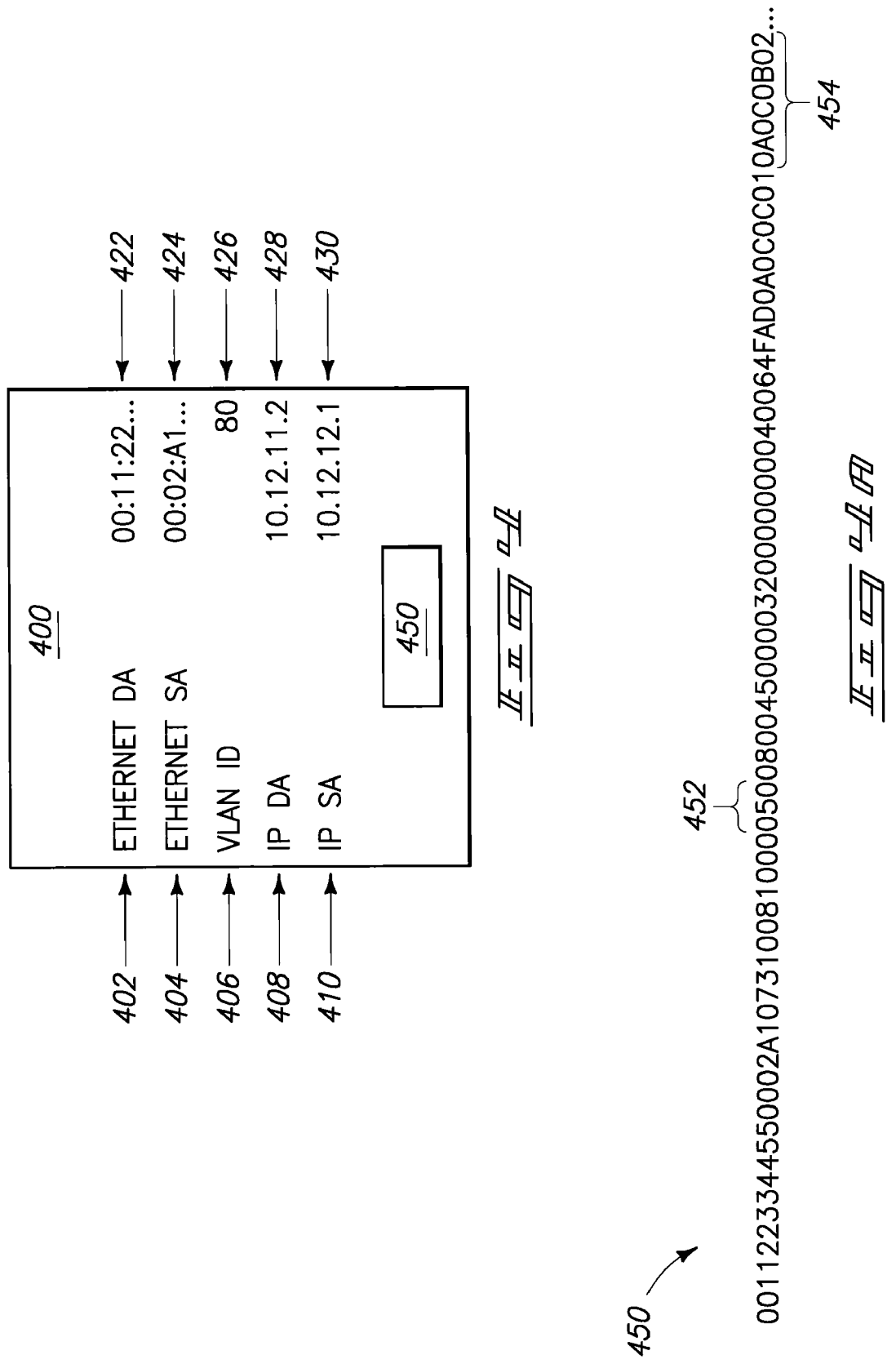

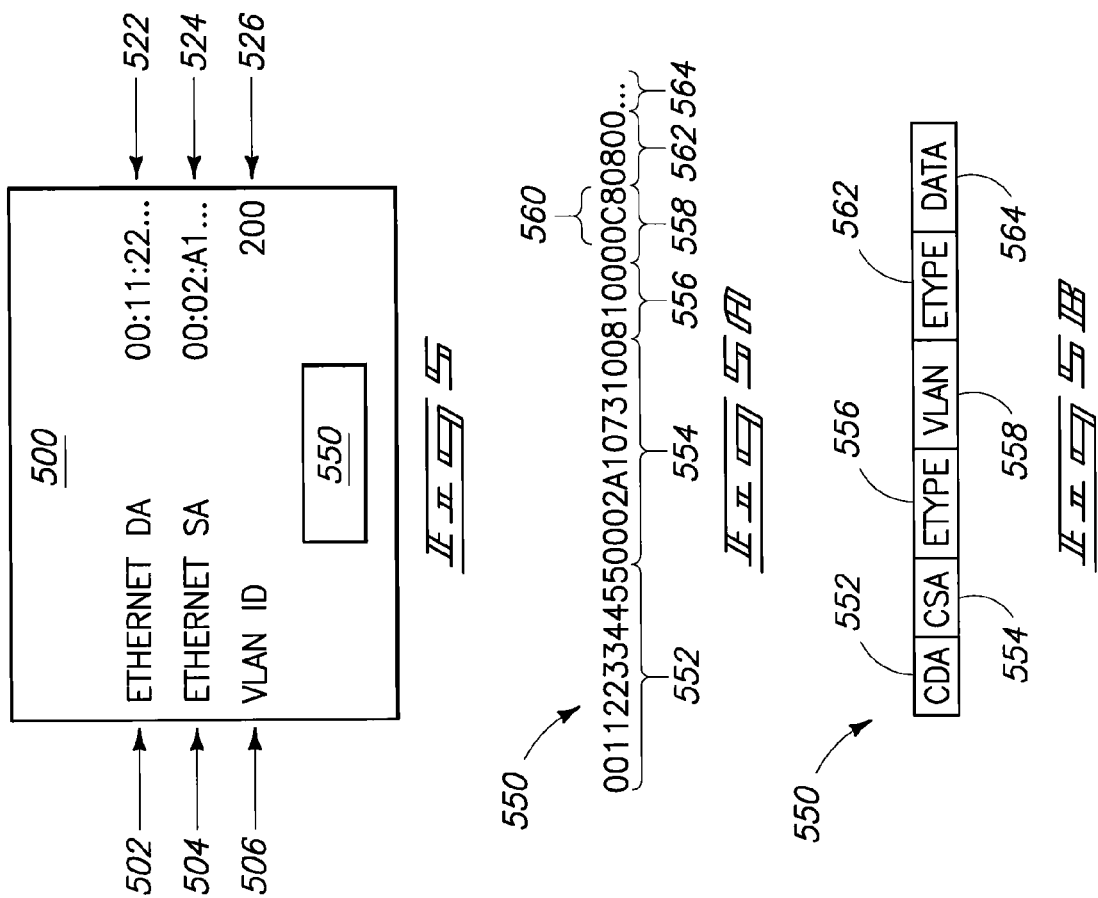

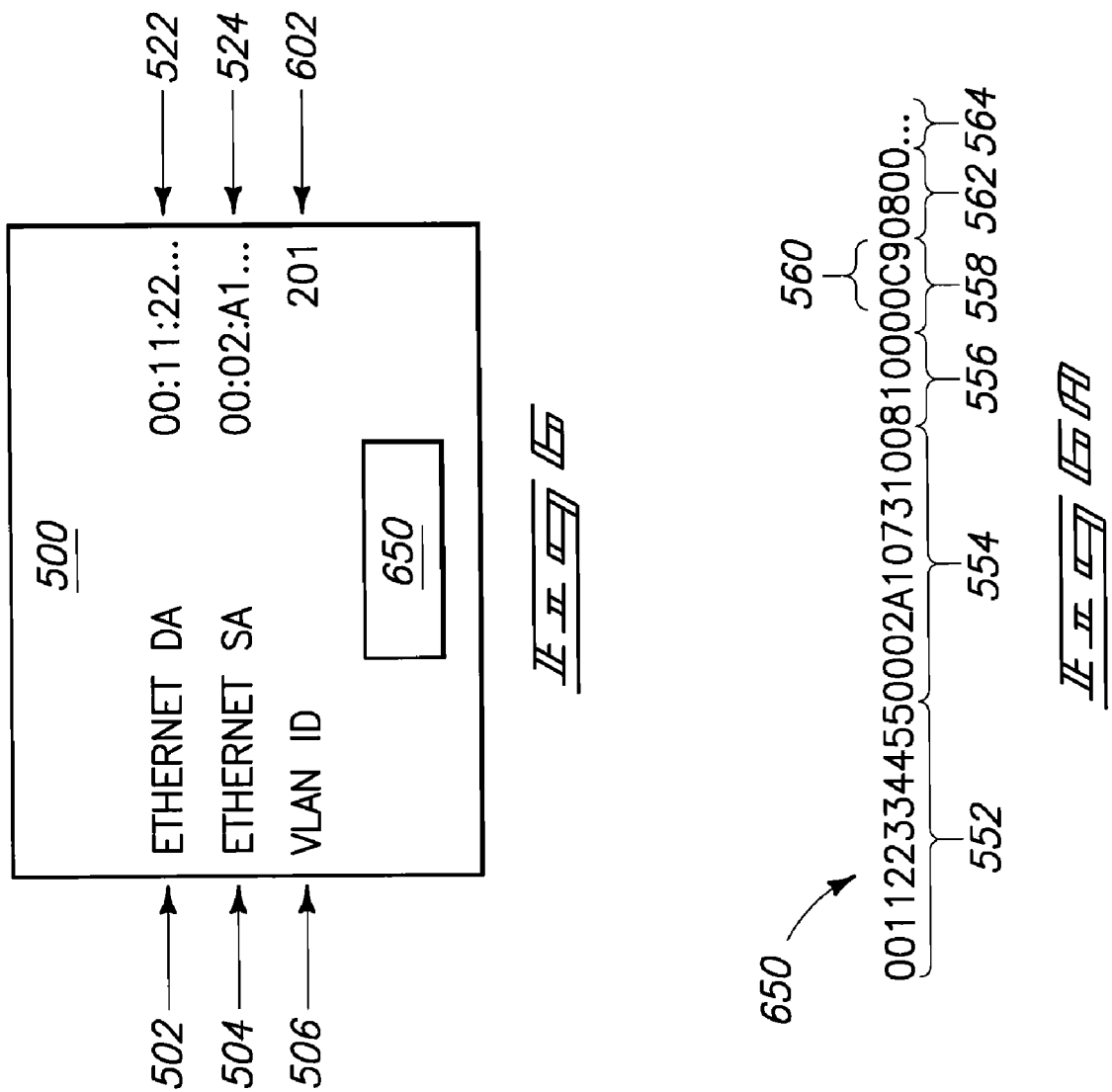

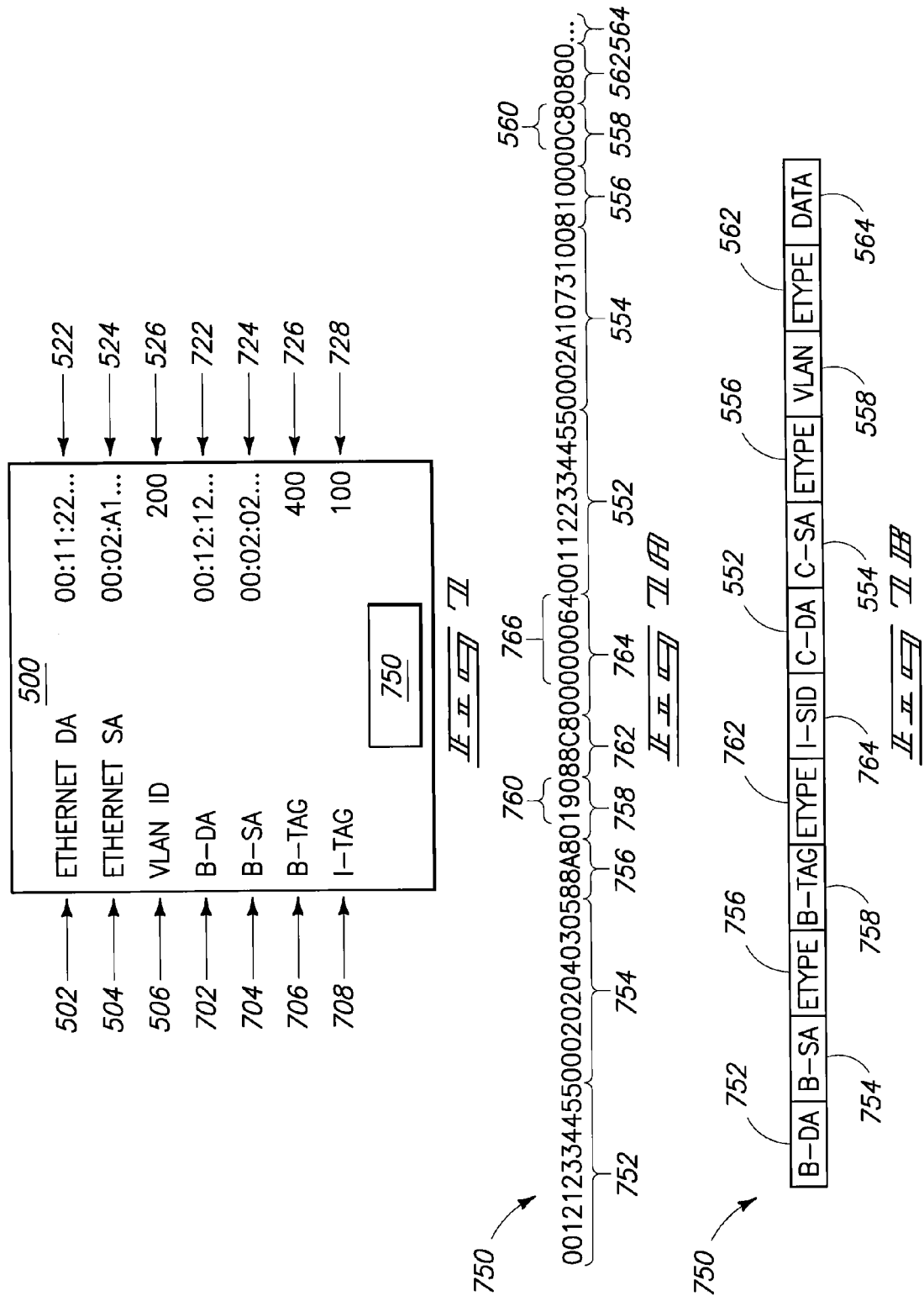

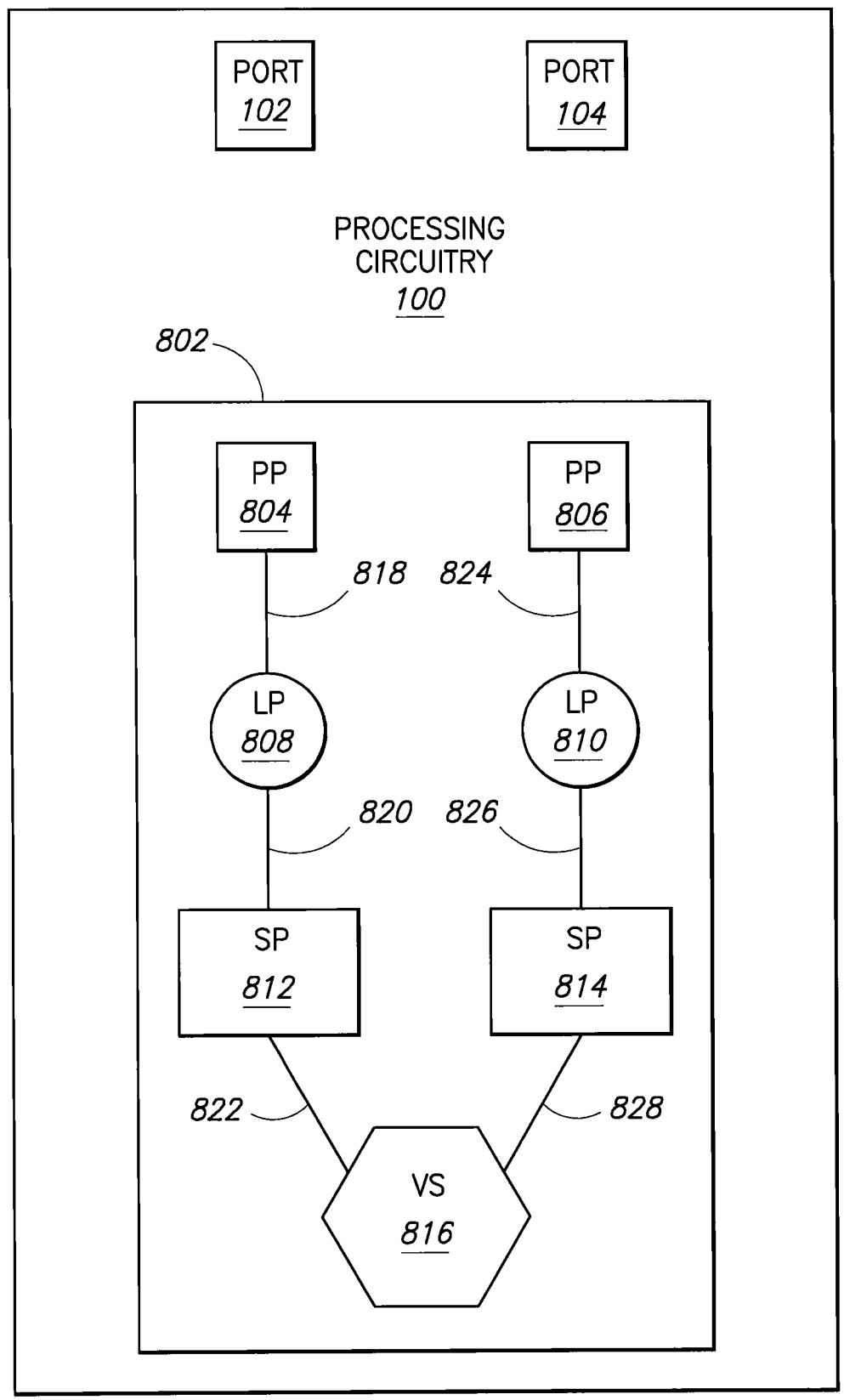

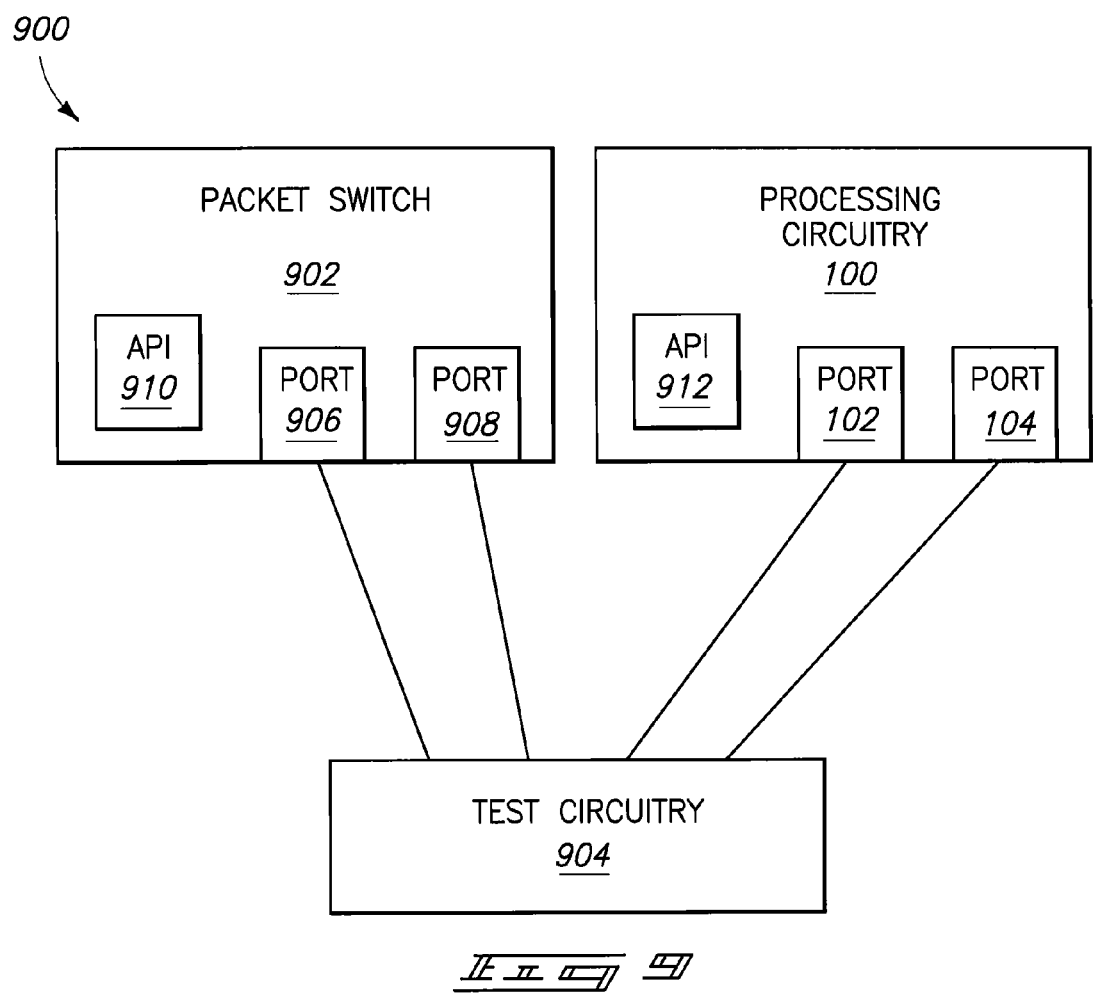

PROCESSING, FORMING, MODIFYING, AND COMPARING PACKET DATA STRUCTURES

TECHNICAL FIELD

The present invention, in various embodiments, relates to processing, forming, modifying, and comparing packet data structures.

BACKGROUND OF THE INVENTION

During the process of testing a packet switch, it may be helpful to generate a test packet using software. Creating the test packet typically involves specifying binary values for many, if not all, of the bits of the test packet. Doing so may not only be tedious and time consuming, but may also require significant training and expertise.

Often, new packet switch features involve adding new fields to a packet, removing existing fields from a packet, or modifying values of existing fields of a packet. Testing such features may involve a test engineer manually searching through binary or hexadecimal values representing the bits of a packet that has been processed by the packet switch to verify that the packet switch properly modified the packet.

For example, a feature may add a field to packets received by the packet switch prior to forwarding the received packets. Verification of such a feature may involve manually searching through binary or hexadecimal values of a processed packet to find the added field and then determining whether the added field is in the correct position within the packet and whether the added field has a correct value. Doing so may be time consuming and may be prone to error due to the tedious nature of such verification.

BRIEF DESCRIPTION OF THE DRAWINGS

Preferred embodiments of the invention are described below with reference to the following accompanying drawings.

FIG. 1 is a block diagram of processing circuitry according to one embodiment.

FIG. 2 is a chart illustrating characteristics of a packet data structure according to one embodiment.

FIG. 3 is a chart illustrating characteristics of a packet data structure according to one embodiment.

FIG. 3A is a chart illustrating hexadecimal values of a packet according to one embodiment.

FIG. 3B is a chart illustrating fields of a packet according to one embodiment.

FIG. 4 is a chart illustrating characteristics of a packet data structure according to one embodiment.

FIG. 4A is a chart illustrating hexadecimal values of a packet according to one embodiment.

FIG. 5 is a chart illustrating characteristics of a packet data structure according to one embodiment.

FIG. 5A is a chart illustrating hexadecimal values of a packet according to one embodiment.

FIG. 5B is a chart illustrating fields of a packet according to one embodiment.

FIG. 6 is a chart illustrating characteristics of a packet data structure according to one embodiment.

FIG. 6A is a chart illustrating hexadecimal values of a packet according to one embodiment.

FIG. 7 is a chart illustrating characteristics of a packet data structure according to one embodiment.

FIG. 7A is a chart illustrating hexadecimal values of a packet according to one embodiment.

FIG. 7B is a chart illustrating fields of a packet according to one embodiment.

FIG. 8 is a block diagram of processing circuitry according to one embodiment and illustrates a packet switch model according to one embodiment.

FIG. 9 is a block diagram of a packet switch test system according to one embodiment.

DETAILED DESCRIPTION OF THE PREFERRED EMBODIMENTS

According to one aspect of the invention, a packet data structure formation method includes receiving a request to create a data structure for representing a packet. The request refers to two or more fields to be included in the packet. In one embodiment, one of the fields may be configured to be used in layer-two forwarding of the packet and another one of the fields may be configured to be used in layer-three forwarding of the packet. The method further includes determining bit values and packet positions associated with the fields; based on the determining, creating a set of bits comprising the packet; and using the data structure, storing the set of bits.

The set of bits comprise the bit values in the packet positions. In one embodiment, the request may include the bit values.

The two or more fields may be arranged in the request in a first order and subsequent to the creating of the set of bits, the two or more fields may be arranged in the packet in a second order different from the first order. The packet may include at least one field not explicitly referred to by the request. This field may include a default value.

The packet may be referred to as a first packet and the request may refer to a second packet. Subsequent to the creating of the set of bits, the first packet may be identical to the second packet except for the two or more fields.

Referring to FIG. 1, a block diagram of processing circuitry 100 is illustrated. Processing circuitry 100 includes two ports 102 and 104. Processing circuitry 100 may comprise circuitry configured to implement desired programming provided by appropriate media in at least one embodiment. For example, processing circuitry 100 may be implemented as one or more of a processor and/or other structure configured to execute executable instructions including, for example, software and/or firmware instructions, and/or hardware circuitry.

Exemplary embodiments of processing circuitry 100 include hardware logic, PGA, FPGA, ASIC, state machines, and/or other structures alone or in combination with a processor. These examples of processing circuitry 100 are for illustration and other configurations are possible. For example, in one embodiment, processing circuitry 100 may be a computer.

Port 102 may be a network interface device (e.g., a network interface card) connected to a network (not illustrated). Port 102 may receive packets (e.g., Ethernet packets) from the network and/or may transmit packets to the network. Port 104 may also be a network interface device. Port 104 may be connected to the same network as port 102 or may be connected to a different network. Port 104 may receive packets from the network to which it is connected and/or may transmit packets to the network to which it is connected.

Processing circuitry 100 may be configured to process packet data structures representing packets. For example, processing circuitry 100 may create the packet data structures, modify the packet data structures, and/or delete the packet data structures. In some configurations, the packet data structures may represent packets received by one or more of port 102 and port 104. Furthermore, bits of the packet data structures may be transmitted as packets using one or more of port 102 and port 104.

In one embodiment, the packet data structures may be objects, for example, objects created using object-oriented programming. Processing circuitry 100 may storage circuitry (not illustrated) and may store the objects in the storage circuitry.

The storage circuitry may be embodied in a number of different ways using electronic, magnetic, optical, electromagnetic, or other techniques for storing information. Some specific examples of storage circuitry include, but are not limited to, a portable magnetic computer diskette, such as a floppy diskette, zip disk, hard drive, random access memory, read only memory, flash memory, cache memory, and/or other configurations capable of storing programming, data, or other digital information. In one embodiment, the storage circuitry may store programming executed by processing circuitry 100.

In one embodiment, processing circuitry 100 may receive a request to create a packet data structure representing a packet, such as an Ethernet packet. In some cases, the request may refer to two or more fields to be included in the packet.

Referring to FIG. 2, a chart depicting a request 200 is illustrated. The request includes two field identifiers 202 and 204 and two values 206 and 208 associated respectively with field identifiers 202 and 204. Field identifier 202 is an Internet Protocol (IP) destination address (DA) field identifier with an associated value 206 of 10.12.11.1 and field identifier 204 is a virtual local area network (VLAN) identifier (ID) field identifier with an associated value 208 of 100.

Request 200 may include field identifiers and corresponding values for different layers of the Open Systems Interconnect (OSI) stack. For example, value 206 is an IP DA, which is associated with layer-three forwarding and value 208 is a VLAN ID, which is associated with layer-two forwarding.

As depicted in FIG. 2, value 206 may have four different decimal numbers separated by periods. Value 206 may be in the format depicted because it may be convenient for an operator who helps form request 200 to use the depicted format. In contrast, other formats may be less convenient. For example, value 206 may be alternatively represented using binary values. However, specifying value 206 using binary values may be inconvenient or difficult for the operator.

After receiving request 200, processing circuitry 100 may form a packet data structure based on field identifiers 202 and 204 and values 206 and 208.

Referring to FIG. 3, a chart illustrating characteristics of a packet data structure 300 is illustrated. Processing circuitry 100 may form packet data structure 300 in response to receiving request 200.

In one embodiment, packet data structure 300 may include a set of bits 350. Processing circuitry 100 may use bits 350 to form a packet that may be transmitted by port 102 or port 104 of processing circuitry 100 to another device (not illustrated) connected to port 102 and/or port 104. In some configurations, processing circuitry 100 may store bits 350 as binary values or hexadecimal values and may represent bits 350 as hexadecimal values within processing circuitry 100.

Referring to FIG. 3A, a representation of bits 350 in a hexadecimal format is depicted. Bits 350 may be grouped into fields 354, 356, 358, 360, 362, 364, 366, 367, 368, 370, and 372. In one embodiment, processing circuitry 100 may perform the grouping based on one or more standards that specify positions of the fields within a packet.

Referring to FIG. 3B, another representation of bits 350 is depicted which illustrates positions of fields 354, 356, 358, 360, 366, 367, 368, 370, and 372 within bits 350 by labeling the fields with field labels. As depicted in FIG. 3B, field 354 may be an Ethernet destination address (EDA), field 356 may be an Ethernet source address (ESA), field 358 may be a first Ethernet type (ETYPE), field 360 may be a VLAN, field 366 may be a second ETYPE, field 367 may be an IP header, field 368 may be an IP source address (IPSA), field 370 may be an IP destination address (IPDA), and field 372 may be data.

In one embodiment, field 372 may include payload data and may also include overhead data. The overhead data may be related to layers 3-7 of the OSI model. For example, the overhead data may include a layer-four port number.

The positions of the fields within FIGS. 3A and 3B may indicate the positions of the fields within a packet formed by processing circuitry 100 using bits 350. For example, in a packet formed using bits 350, field 354 may be at the beginning of the packet followed by field 356 which may be followed by field 358 and so on, concluding with field 372. In some embodiments, when forming the packet from bits 350, processing circuitry 100 may include additional bits not illustrated in FIG. 3B, for example preamble bits. These additional bits may or may not be included in bits 350.

Although field labels associated with fields 354, 356, 358, 360, 366, 367, 368, 370, and 372 are depicted in FIG. 3B, bits 350 might not include the labels. Instead, bits 350 may include values of the fields. In this case, the fields may be distinguished from each other by their position within bits 350, rather than by field labels within bits 350. Some of the fields of bits 350 may themselves include a field. For example, field 360 includes fields 362 and 364, which may be referred to as subfields.

Returning now to FIG. 3, several field identifiers 302, 304, 306, 308, 310 along with corresponding values 322, 324, 326, 328, and 330 are illustrated. For example, field identifier 306 indicates that a VLAN ID field is associated with packet data structure 300 and value 326 indicates that value 326 of the VLAN ID field is 100. Note that bits 350 may include fields not explicitly included in the chart of FIG. 3. For example, as illustrated in FIGS. 3A and 3B, bits 350 may include ETYPE field 358, but ETYPE field 358 is not explicitly included in the chart of FIG. 3.

In one embodiment, packet data structure 300 may store a single data member, namely bits 350. In this embodiment, packet data structure 300 may have many different methods (e.g., object methods) that may be used to extract information stored in the single data member (bits 350). For example, packet data structure 300 may have a method configured to locate an IP DA field (e.g., field 370) within bits 350 and return the value of the IP DA field in a desired format (e.g., as four decimal numbers separated by periods).

Packet data structure 300 may additionally or alternatively include methods that may be used to alter the values of fields of bits 350. For example, packet data structure 300 may have a method configured to accept an IP address in a desired format and to modify an IP DA field of bits 350 (e.g., field 370) to have the IP address accepted by the method. Similarly, packet data structure 300 may have other methods that may add fields to bits 350 or remove fields from bits 350.

In this embodiment, values 322, 324, 326, 328, and 330 illustrated in FIG. 3 may represent the result of calling one or more methods associated with packet data structure 300. For example, value 324 (which is associated with field identifier 304) may represent a value returned by calling a method configured to find Ethernet SA field 356 (illustrated in FIGS. 3A and 3B) within bits 350 and return the value of field 356.

In another embodiment, packet data structure 300 may include a plurality of data members in addition to bits 350.

The additional data members may store the values and/or positions within bits 350 of one or more of the individual fields of bits 350. In some cases, the values of the fields may be stored in both the additional data members and bits 350 and the values stored by the additional data members may be used to update the values stored in bits 350. The additional data members may be created, modified, and/or deleted using methods of packet data structure 300.

In this embodiment, if one of the additional data members is modified using a method of packet data structure 300, the method may, in addition to modifying the value of a field associated with the additional data member, update the data member storing bits 350 to have the proper value of the field stored by the additional data member so that bits 350 reflect the current value of the field.

Furthermore, in this embodiment, values 322, 324, 326, 328, and 330 illustrated in FIG. 3 may represent the additional data members of packet data structure 300.

In yet another embodiment, packet data structure 300 may have a plurality of data members such as the above-described additional data members. Each of the data members may store value(s) of one or more fields. In this embodiment, packet data structure 300 might not have bits 350 as a data member. In this embodiment, bits 350 may be created via a method of packet data structure 300 by concatenating the values stored by the plurality of data members.

Processing circuitry 100 may form packet data structure 300 in response to receiving request 200. In doing so, processing circuitry 100 may determine binary values and/or hexadecimal values corresponding to values 206 and 208 of request 200. For example, processing circuitry 100 may convert value 206 to a binary or hexadecimal format. In some cases, values specified in the request may already be in an acceptable format (e.g., a binary or hexadecimal format). Accordingly, in these cases conversion of the values might not be necessary.

Processing circuitry 100 may then determine positions for each of the converted values within a packet represented by packet data structure 300. In doing so, processing circuitry 100 may analyze field label 202 and determine that field label 202 corresponds to field 370. Likewise, processing circuitry 100 may analyze field label 204 and determine that field label 204 corresponds to field 360.

Processing circuitry 100 may then store the converted versions of values 206 and 208 in packet data structure 300. In one embodiment, processing circuitry 100 may create bits 350 and store the converted versions of values 206 and 208 in bits 350. In another embodiment, processing circuitry 100 may create data members of packet data structure 300 for each of the converted versions of values 206 and 208 and store the converted versions of values 206 and 208 in the data members.

Note that request 200 need not specify values 206 and 208 in the order in which the values appear in a packet represented by packet data structure 300. For example, request 200 may specify a value for the IP DA field first and a value for the VLAN ID field second even though the VLAN ID field may appear before the IP DA field in a packet represented by packet data structure 300.

In one embodiment, processing circuitry 100 may specify values for each of the fields of bits 350 even though the values might not be included in request 200. Processing circuitry 100 may use default values for fields not specified in request 200. For example, processing circuitry 100 may specify a default value for Ethernet DA field 354 and Ethernet SA field 356.

In one embodiment, request 200 may refer to a reference packet data structure. Processing circuitry 100 may use the field values of the reference packet data structure in creating bits 350 instead of using default values.

FIG. 4 is a chart illustrating characteristics of a reference packet data structure 400. Packet data structure 400 includes bits 450. Furthermore, FIG. 4 illustrates several field identifiers 402, 404, 406, 408, and 410 along with corresponding values 422, 424, 426, 428, and 430. As was described above in relation to packet data structure 300, packet data structure 400 may store values 422, 424, 426, 428, and 430 in a data member storing bits 450 and may alternatively or additionally store values 422, 424, 426, 428, and 430 in other data members of packet data structure 400. Furthermore, packet data structure 400 may store additional values not illustrated in FIG. 4 (e.g., in bits 450) such as an ETYPE field value or a data field value.

FIG. 4A illustrates a representation of bits 450 in a hexadecimal format. As with bits 350 described above, bits 450 may be grouped into fields based on one or more standards that specify positions of the fields within a packet. Bits 450 may represent the bits of a packet represented by packet data structure 400.

In one embodiment, request 200 may refer to packet data structure 400. As a result, processing circuitry 100 may create bits 350 so that bits 350 are identical to bits 450 except that value 206 is used for IP DA field 370 of bits 350 instead of the IP DA field value (10.12.11.2) of packet data structure 400 and value 208 is used for VLAN ID field 360 of bits 350 instead of the VLAN ID field value (80) of packet data structure 400. Accordingly, bits 450 as illustrated in FIG. 4A may be identical to bits 350 as illustrated in FIG. 3A except for field 360 (the VLAN ID field) and field 370 (the IP DA field).

According to another aspect of the invention, an article of manufacture includes a computer readable medium storing computer program code configured to be executed by a computer. The computer program code is configured to access a set of bits of a packet and determine two or more fields are present within the set of bits. Determining that the two or more fields are present may include identifying bit patterns associated with network protocols.

The code is further configured to partition the set of bits into two or more subsets of the set of bits based on the determination. The two or more subsets correspond to the two or more fields. Some of the bits of one of the two or more subsets may also belong to another one of the two or more subsets.

The code is further configured to associate identifiers with the two or more fields and create a data structure configured to allow the two or more subsets corresponding to the two or more fields to be individually modified by referring to the identifiers associated with the fields. The two or more fields are associated with different identifiers relative to one another. The identifiers might not be present in the set of bits.

In one embodiment, the data structure may be an object having methods configured to allow the two or more subsets corresponding to the two or more fields to be individually modified by referring to the identifiers associated with the two or more fields.

One of the two or more fields may include a layer-two destination address, a layer-two source address, a layer-three destination address, a layer-three source address, a time-to-live value, a Virtual Local Area Network (VLAN) identifier, a Multiprotocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

The set of bits may be referred to as a first set of bits. The computer program code may be further configured to receive a request to add an additional field to the packet subsequent to the creating of the data structure. The request may include an additional identifier identifying the additional field and a value in a first format. The computer program code may be further configured to convert the value from the first format to a second format. When in the second format, the value may include a second set of bits.

Based on the additional identifier, the computer program code may determine a position within the packet where the second set of bits are to be located, modify the first set of bits to include the second set of bits at the position, and transmit the modified first set of bits to a device via a network interface. The computer program code may be further configured to receive a request to display one of the two or more fields and in response display the one field in a decimal format.

In one embodiment, processing circuitry 100 may create packet data structure 300 in response to receiving a packet comprising bits 350 from port 102 or port 104. After receiving bits 350, processing circuitry 100 may access bits 350 and determine that fields are present in bits 350. For example, in keeping with known methods, processing circuitry 100 may examine bits 350 for particular bit patterns associated with known network protocols and may determine the lengths of the fields and the positions of the fields within bits 350 based on the patterns.

Processing circuitry 100 may partition bits 350 into fields (e.g., fields 354, 356, 358, 360, 362, 364, 366, 367, 368, 370, and 372). As was described above, packet data structure 300 may have one or more methods that return values of the fields of bits 350. For example, packet data structure 300 may have a method that returns the value of the Ethernet SA of field 356.

Packet data structure 300 may associate each field with a field identifier. For example, packet data structure 300 may associate field 354 with the field identifier "Ethernet DA." In some configurations, the field identifier may be a method. For example, a method named "Return_Ethernet_DA" may be associated with field 354 so that if the method is called, processing circuitry 100 may return the value of field 354. Of course, as was described above, processing circuitry 100 may convert the value into a different format before returning the value. For example, processing circuitry 100 may convert the value from a binary or hexadecimal format to a decimal format.

According to another aspect of the invention, a packet data structure modification method includes providing a data structure comprising a first set of bits representing a packet and receiving a request to modify the data structure. The request includes an identifier identifying a packet field and a value. The value is in a first format. The data structure may include an object and the receiving of the request may include receiving the request as a result of a method of the object being called.

The method also includes converting the value from the first format to a second format wherein the value, when in the second format, is a second set of bits. The first format may be a decimal format and the second format may be a binary format.

The method also includes determining a position within the packet where the second set of bits are to be located based on the identifier and modifying the first set of bits to include the second set of bits at the position. The request might not explicitly describe the position. Prior to the modifying of the first set of bits, the packet might not include the packet field. Modifying the first set of bits may include modifying the first set of bits without modifying a layer-two address of the packet.

The value may be referred to as a first value and prior to the modifying of the first set of bits, the packet may include the packet field, but the packet field may include a second value different from the first value.

Several methods of creating a packet data structure are described above. Once a packet data structure has been created, processing circuitry 100 may modify the packet data structure. For example, values of fields of the packet data structure may be modified, new fields may be added to the packet data structure, and/or fields may be removed from the packet data structure.

An example of modifying an existing field of a packet data structure will now be described.

FIG. 5 is a chart illustrating characteristics of a packet data structure 500. Packet data structure 500 includes bits 550. Furthermore, FIG. 5 illustrates several field identifiers 502, 504, and 506 along with corresponding values 522, 524, and 526.

FIG. 5A illustrates a representation of bits 550 in a hexadecimal format. Bits 550 may represent the bits of a packet represented by packet data structure 500. Bits 550 include fields 552, 554, 556, 558, 560, 562, and 564.

Referring to FIG. 5B, another representation of bits 550 is depicted which illustrates positions of fields 552, 554, 556, 558, 562, and 564 within bits 550 by labeling the fields with field labels.

Processing circuitry 100 may create packet data structure 500 and may subsequently receive a request to modify one of the values of one of the fields of bits 550. For example, processing circuitry 100 may receive an Application Programming Interface (API) call, method call associated with packet data structure 500, or an explicit request from a user requesting that the VLAN ID be changed from 200 to 201. The request may include a field identifier (e.g., VLAN ID) and a value (e.g., 200). The VLAN ID may initially be in a format that is not a binary or hexadecimal format. In response to the request, processing circuitry 100 may convert the value into a binary or hexadecimal format.

In some configurations, the request might not specify the position of field 558 (the VLAN ID field) within bits 550. Accordingly, processing circuitry 100 may determine a position within bits 550 where field 558 is located. Processing circuitry 100 may use the field identifier from the request to determine the position. For example, processing circuitry 100 may determine the position based on a network protocol standard that specifies the position of the field identifier. Using the position, processing circuitry 100 may then replace the value in field 558 (currently 00C8) with the converted value (00C9).

FIGS. 6 and 6A illustrate packet data structure 500 subsequent to being modified by processing circuitry 100 according to the request.

FIG. 6 is a chart illustrating characteristics of a packet data structure 500. Packet data structure 500 includes bits 650. Furthermore, FIG. 6 illustrates several field identifiers 502, 504, and 506 along with corresponding values 522, 524, and 602.

FIG. 6A illustrates a representation of bits 650 in a hexadecimal format. Bits 650 may represent the bits of a packet represented by packet data structure 500. Bits 650 include fields 552, 554, 556, 558, 560, 562, and 564.

Note that bits 650 are identical to bits 550 except that field 558 of bits 650 has a hexadecimal value of 00C9 (201 in decimal) which is the new value specified in the request and field 558 of bits 550 has a hexadecimal value of 00C8 (200 in decimal) which is the original VLAN ID value that packet data structure 500 had prior to processing circuitry 100 receiving the request. Accordingly, the values of address fields (such as Customer DA field 552 and Customer SA field 554) have not been changed as a result of the request.

Processing circuitry 100 may transmit bits 650 as a packet using port 102 and/or port 104.

An example of adding fields to a packet data structure will now be described. Subsequent to creating packet data structure 500, processing circuitry 100 may receive a request to add one or more fields to packet data structure 500. For example, processing circuitry 100 may receive an API call, method call associated with packet data structure 500, or an explicit request from a user requesting that a backbone DA (B-DA), backbone SA (B-SA), first ETYPE, backbone tag (B-TAG), second ETYPE, and instance service identifier (I-SID) fields be added to packet data structure 500. The request may include field identifiers and corresponding values for the fields to be added. The values may initially be in a format that is not a binary or hexadecimal format. In response to the request, processing circuitry 100 may convert the values into a binary or hexadecimal format.

In some configurations, the request might not specify the positions where the fields should be inserted into bits 550. Accordingly, processing circuitry 100 may determine positions within bits 550 where the fields should be added. Processing circuitry 100 may use the field identifiers from the request to determine the positions. Using the positions, processing circuitry 100 may then add the converted values to bits 550.

FIGS. 7, 7A, and 7B illustrate packet data structure 500 subsequent to the fields specified by the request being added.

FIG. 7 is a chart illustrating characteristics of a packet data structure 500. Packet data structure 500 includes bits 750. Furthermore, FIG. 7 illustrates several field identifiers 502, 504, 506, 702, 704, 706, and 708 along with corresponding values 522, 524, 526, 722, 724, 726, and 728.

FIG. 7A illustrates a representation of bits 750 in a hexadecimal format. Bits 750 may represent the bits of a packet represented by packet data structure 500. Bits 750 include fields 552, 554, 556, 558, 560, 562, 564, 752, 754, 756, 758, 760, 762, 764, and 766.

Referring to FIG. 7B, another representation of bits 750 is depicted which illustrates positions of fields 552, 554, 556, 558, 562, 564, 752, 754, 756, 758, 762, and 764 within bits 750 by labeling the fields with field labels. Note that bits 750 include the new fields specified by the request (fields 752, 754, 756, 758, 762, and 764).

Processing circuitry 100 may transmit bits 750 as a packet using port 102 and/or port 104.

According to another aspect of the invention, a packet data structure modification method includes providing a data structure comprising a set of bits representing a packet and receiving a request to modify the data structure. The packet may be an Ethernet packet. The request includes an identifier identifying a packet field. The method also includes identifying a subset of the set of bits that comprise the packet field based on the identifier and removing the subset from the set of bits.

The subset may include one or more of at least one Virtual Local Area Network (VLAN) identifier, at least one Multi-protocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

The subset may be referred to as a first subset and the method may further include concatenating a second subset of the set of bits with a third subset of the set of bits subsequent to the removing of the subset. Prior to the removing of the first subset, the second subset may be positioned within the set of bits so as to be ahead of the first subset with respect to a transmission order of the bits and the third subset may be positioned within the packet behind the first subset with respect to the transmission order. The transmission order may indicate an order in which the bits are arranged when formed into the packet.

In addition to illustrating the modification of a field and the addition of fields, packet data structure 500 may be used to illustrate an example of removing fields from a packet data structure.

Processing circuitry 100 may initially create packet data structure 500 having bits 750 as illustrated in FIGS. 7, 7A, and 7B. Subsequently, processing circuitry 100 may receive a request to remove one or more fields from packet data structure 500. For example, processing circuitry 100 may receive an API call, method call associated with packet data structure 500, or an explicit request from a user requesting that a backbone DA (B-DA), backbone SA (B-SA), first ETYPE, backbone tag (B-TAG), second ETYPE, and instance service identifier (I-SID) fields be removed from packet data structure 500. The request may include field identifiers identifying the fields to be removed.

Processing circuitry 100 may use the field identifiers from the request to determine the positions of the fields. Using the positions, processing circuitry 100 may then remove the fields from bits 750.

As a result, packet data structure 500 may include bits 550 rather than bits 750. Note that as illustrated in FIGS. 5A and 5B, bits 550 do not include the fields specified in the request.

Processing circuitry 100 may subsequently transmit bits 550 as a packet using port 102 and/or port 104.

According to another aspect of the invention, a packet data structure comparison method includes accessing a first packet data structure including a first set of bits and a second packet data structure including a second set of bits. The method further includes comparing the first set of bits to the second set of bits and based on the comparing, identifying at least one third set of bits present in the first set of bits but not present in the second set of bits. The method may further include identifying at least on fourth set of bits present in the second set of bits but not present in the first set of bits.

The method also includes determining that the third set of bits includes a field of the first packet that is either not present in the second packet or that is present in the second packet but has a value in the first packet that is different than a value of the field in the second packet.

The method also includes, based on the determining, communicating a difference between the first packet and the second packet using an identifier of the field. The name may be descriptive of the field. The third set of bits may include the value of the field of the first packet in a binary format and the method may further include converting the value of the field of the first packet to a decimal format. Communicating the difference may include communicating the difference using the converted value.

An example of comparing two packet data structures will now be described.

Processing circuitry 100 may access packet data structure 300 (see FIGS. 3, 3A, and 3B) and packet data structure 400

(see FIGS. 4 and 4A). Processing circuitry 100 may then compare bits 350 to bits 450. Based on the comparison, processing circuitry 100 may determine that the bits of fields 360 and 452 do not match and that the bits of fields 370 and 454 do not match. Processing circuitry 100 may further determine that fields 360 and 452 are both VLAN ID fields and that fields 370 and 454 are both IP DA fields.

As a result, processing circuitry 100 may communicate the fact that fields 360 and 452 do not match and that fields 370 and 454 do not match. In one embodiment, processing circuitry 100 may communicate the mismatch to a user. In communicating the mismatch, processing circuitry 100 may indicate the field identifiers of the mismatching fields (VLAN ID and IP DA). Processing circuitry 100 may also indicate the mismatched values. Prior to indicating the mismatched values, processing circuitry 100 may convert the values from a binary or hexadecimal format into a preferred format such as a decimal format.

Communicating the differences between packet data structure 300 and packet data structure 400 in this manner may save time for a user compared with the tedious process of the user directly comparing bits 350 to bits 450, determining a field identifier associated with the mismatched bits, and converting the binary or hexadecimal versions of the mismatched bits into a preferred format. As is described below in relation to FIG. 9, test circuitry may compare two packet data structures during the process of determining whether a packet switch is operating according to expected behavior.

According to another aspect of the invention, a packet switch modeling method includes identifying functionality of a packet switch to be modeled and creating, in a packet switch model, a plurality of nodes representing physical and/or logical elements of the packet switch. The nodes are configured to process packets and to respectively model different portions of the functionality of the packet switch relative to one another. The method also includes, in the packet switch model, connecting the nodes with pathways by which the packets may be forwarded between the nodes. The method may further include generating a topology diagram illustrating the plurality of nodes and the pathways connecting the plurality of nodes.

At least one node of the plurality may represent a physical port of the packet switch, a logical port of the packet switch, a sub port of a logical port of the packet switch, or a virtual switch of the packet switch.

The method may further include receiving a configuration command describing the functionality of the packet switch. Identifying the functionality of the packet switch may include identifying the functionality based on the configuration command.

The method may further include receiving a first packet from a device that is external to the model, creating a packet data structure representing the first packet, assigning the packet data structure to a first node of the plurality of nodes based on first information comprised by the first packet, forwarding the packet data structure to a second node of the plurality of nodes based on second information comprised by the first packet, modifying the packet data structure according to a rule associated with the second node of the plurality of nodes, creating a second packet based on the modified packet data structure, and transmitting the second packet to the device. The first information may include one or more addresses. In one embodiment, the method may further include modifying the rule in response to receiving a configuration instruction.

The device may include a test device configured to send the packet to a packet switch, to receive a response packet from the packet switch, and to compare the response packet with the modified packet.

The first node may represent a logical port of the packet switch and the second node may represent a sub port of a logical port of the packet switch. Modifying the received packet may include replacing a virtual local area network (VLAN) identifier of the received packet with a VLAN identifier associated with the sub port.

According to another aspect of the invention, an article of manufacture includes a computer readable medium storing computer program code configured to be executed by a computer. The computer program code is configured to identify functionality of a packet switch to be modeled and to create, in a packet switch model, a plurality of nodes representing physical and/or logical elements of a packet switch. The nodes are configured to process packet data structures and to respectively model different portions of the functionality of the packet switch relative to one another.

The computer program code is further configured to connect the nodes with pathways by which the packet data structures may be forwarded between the nodes.

The computer program code is also configured to receive a first packet from a device (e.g., a device external to a computer executing the computer program code), create a packet data structure representing the first packet, assign the packet data structure to a first node of the plurality of nodes based on first information comprised by the first packet, forward the packet data structure to a second node of the plurality of nodes based on second information comprised by the first packet, modify the packet data structure according to a rule associated with the second node, create a second packet based on the modified packet data structure, and transmit the second packet to the device. In one embodiment, the computer program code may be configured to modify the packet data structure by adding a transport identifier to the packet data structure.

The transport identifier may include one or more of at least one Virtual Local Area Network (VLAN) identifier, at least one Multiprotocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

During the process of developing new packet switch features or behaviors, the need to test the new features may arise. Such testing may be accomplished by sending test packets into the packet switch and analyzing packets transmitted by the packet switch in response to receiving the test packets to determine whether the new packet switch features are operating as expected.

To independently verify that the new features are operating as expected, it may be desirable to create a model of the expected packet switch behavior. The model may then be used to verify that the actual packet switch is behaving as expected.

Packet switches typically include specialized hardware controlled by firmware or software. The hardware may be configured to efficiently process packets at very high rates.

The model of the packet switch, in contrast, may be implemented by software executed by general purpose hardware such as one or more personal computers or servers. Since general purpose hardware is used to execute the software, the model might not be able to process packets as quickly as the packet switch being modeled. However, speed might not be as important during testing as the ability to verify expected packet switch behavior.

Referring to FIG. 8, in one embodiment, processing circuitry 100 may implement a packet switch model 802. Model 802 may include a plurality of nodes including physical port nodes 804 and 806, logical port nodes 808 and 810, sub port nodes 812 and 814, and a virtual switch node 816. The nodes of model 802 may be interconnected with pathways 818, 820, 822, 824, 826, and 828 as illustrated in FIG. 8.

Model 802 may represent functionality of the packet switch being modeled by using the nodes of model 802 to modify one or more data members of a packet data structure (e.g., packet data structure 300 described above).

Individual nodes of model 802 may imitate particular functionality of the packet switch being modeled by model 802 according to rules associated with the nodes. For example, node 804 may imitate packet processing performed by a physical port of the packet switch being modeled and node 816 may imitate packet processing performed by a virtual switch of the packet switch being modeled.

A first node of model 802 may imitate packet processing of the packet switch being modeled by modifying one or more data members (e.g., bits 350 of packet data structure 300) of a packet data structure according to a rule and then passing the data structure to a second node of model 802 to which the first node is connected via a pathway. The second node may then modify one or more data members of the packet data structure and pass the data structure to a third node connected to the second node via a pathway, and so on.

By way of example, a rule associated with node 812 may specify that the value of an existing field of a data member of a packet data structure received by node 812 is to be modified, that a new field is to be added to the data member, and/or that an existing field is to be removed from the data member in the manner described above in relation to FIGS. 1-7. In one embodiment, node 812 may add one or more new fields that together comprise a transport identifier used in layer-two forwarding of packets.

The nodes may additionally or alternatively perform other processing. For example, a particular node might not modify a data member of a packet data structure, but instead may inspect fields of the data member and based on the inspection, select one of a plurality of nodes connected to the particular node via pathways to which to pass the packet data structure.

For example, logical port node 810 may be connected via pathways to physical port node 806 and to another physical port node (not illustrated). Upon being passed a packet data structure, node 810 may inspect a data member of the packet data structure and determine that the packet data structure is to be passed to node 806 via pathway 824

The packet data structure may be passed from one node to another in a variety of ways. For example, in one embodiment, each node of the model may be an object created by object oriented programming and a first node of the model may pass the packet data structure to a second node of the model via a pathway by simply calling a method of the second node and passing a pointer to the packet data structure in the method call.

By way of example, port 102 of processing circuitry 100 may receive a packet from a device connected to port 102. Upon receiving the packet, processing circuitry 100 may create a packet data structure representing the received packet using the methods described above. Processing circuitry 100 may then analyze one or more values of fields of the packet data structure and based on the analysis, assign the packet data structure to node 804. Node 804 may process the packet data structure according to a rule associated with node 804 (e.g., by modifying a value of a field of the packet data structure) and then pass the packet data structure to node 808 via pathway 818 based on one or more values of fields of the packet data structure (e.g., a destination address or a source address).

Node 808 may process the packet data structure according to a rule associated with node 808 (e.g., replacing the value of the VLAN ID field with a new value associated with node 808) and then pass the packet data structure to node 812 via pathway 820. Node 812 may process the data structure according to a rule (e.g., by adding a set of fields comprising a transport identifier) and then pass the packet data structure to node 816 via pathway 822.

The packet data structure may then be processed by node 816, passed to node 814 via pathway 828, processed by node 814, passed to node 810 via pathway 826, processed by node 810, passed to node 806 via pathway 824, and then processed by node 806. Upon completion of processing by node 806, processing circuitry 100 may transmit bits stored by the packet data structure that represent the packet using port 104.

Of course, model 802 may include additional nodes and pathways that may increase the sophistication of model 802. For example, node 816 may be connected via pathways to several additional nodes and the processing performed by node 816 may include selecting to which of the connected nodes node 816 should forward the packet data structure.

In one embodiment, the nodes of model 802 may be objects and processing circuitry 100 may instantiate the nodes via object-oriented programming. Processing circuitry 100 may initially create the nodes of model 802 in response to receiving a configuration command. The configuration command may describe desired functionality of the packet switch being modeled by model 802. The configuration command may advantageously be in a format accepted by the packet switch being modeled by model 802 so that the configuration command may be used for the packet switch and/or for model 802.

Upon receiving the configuration command, processing circuitry 100 may analyze the configuration command to determine the nodes of model 802 to be created and the pathways to connect the nodes of model 802. Processing circuitry 100 may also determine rules associated with the nodes of model 802 from the configuration command. Processing circuitry 100 may then create and configure the nodes of model 802 and interconnect the nodes with pathways.

In some cases, after model 802 has been created, processing circuitry 100 may receive a configuration command specifying that the behavior of model 802 should be changed. In response, model 802 may modify the rules associated with one or more of the nodes of model 802 so that the desired behavior is obtained.

In one embodiment, processing circuitry 100 may generate a topology diagram of model 802. A user may subsequently view the topology diagram. The topology diagram may be useful in troubleshooting. For example, a user may visually determine that model 802 is incorrect by comparing model 802 to an expected topology of model 802. The user may also use the topology diagram to inspect the number of nodes of model 802 and the way that the nodes of model 802 are interconnected. In one configuration, the topology diagram may look like FIG. 8.

According to another aspect of the invention, a packet switch test system includes a packet switch, processing circuitry configured to operate independent of the packet switch and to execute instructions configured to model an expected behavior of the packet switch, and test circuitry in communication with the packet switch and the processing circuitry.

The test circuitry is configured to send an original test packet to the packet switch and to send a duplicate of the original test packet to the processing circuitry.

The packet switch is configured to modify the original test packet and to send the modified original test packet to the test circuitry. The processing circuitry is configured to modify the duplicate according to the expected behavior and to send the modified duplicate to the test circuitry. The test circuitry is configured to determine whether the packet switch is operating according to the expected behavior by comparing the modified original test packet to the modified duplicate. The test circuitry may be further configured to indicate differences between the modified original test packet and the modified duplicate.

The original test packet, the duplicate, the modified original test packet, and the modified duplicate may be Ethernet packets and the packet switch may be an Ethernet packet switch comprising a plurality of ports. The Ethernet packet switch may be configured to forward a packet received on one of the ports of the plurality to one or more of the other ports of the plurality.

The test circuitry may be further configured to send the duplicate to a first port of the processing circuitry and the processing circuitry may be configured to send the modified duplicate to the test circuitry using a second port of the processing circuitry. The second port may be different from the first port.

In one embodiment, the test circuitry may be further configured to send configuration instructions to the packet switch prior to sending the original test packet to the packet switch and to send the configuration instructions to the processing circuitry prior to sending the duplicate to the processing circuitry.

According to another aspect of the invention, a packet switch test method includes receiving a first packet from a packet switch, receiving a second packet from processing circuitry configured to model expected behavior of the packet switch, comparing the first packet to the second packet, and based on the comparing, determining whether the packet switch is operating according to the expected behavior. Determining whether the packet switch is operating according to the expected behavior may include determining that the first packet is identical to the second packet.

Comparing the first packet to the second packet may include comparing a first subset of a first set of bits of the first packet to a corresponding second subset of a second set of bits of the second packet. In one embodiment, bits of the first set that do not belong to the first subset may be payload bits with respect to a layer-two header of the first packet. In one embodiment, bits of the first set that do not belong to the first subset may include a time stamp.

The method may further include sending a test packet to the processing circuitry via a first port of the processing circuitry prior to the receiving of the second packet. The receiving of the second packet may include receiving the second packet via a second port of the processing circuitry. The first port may be different than the second port. In one embodiment, the test packet may be identical to the second packet.

The packet data structures and packet models described above may be used in a test system to test functionality of a packet switch.

Referring to FIG. 9, a test system 900 is illustrated. System 900 includes a packet switch 902, processing circuitry 100 (described above), and test circuitry 904. Packet switch 902 includes two ports 906 and 908. Two ports are illustrated for simplicity; packet switch 902 may include more than two ports. Packet switch 902 also includes an API 910. Processing circuitry 100 also includes an API 912. Test circuitry 904 may communicate with packet switch 902 via API 910. For example, test circuitry 904 may send a configuration command to packet switch 902 via API 910. Similarly, test circuitry 904 may send a configuration command to processing circuitry 100 via API 912.

Processing circuitry 100 may implement a packet switch model such as model 802 described above. The model may be configured to imitate the functionality of packet switch 902. Accordingly, the model may include nodes having rules and pathways that imitate the functionality of packet switch 902.

As was described above, in some embodiments, processing circuitry 100 may create the model based on a configuration command. In some cases, test circuitry 904 may send the same configuration command to packet switch 902. Since both processing circuitry 100 and test circuitry 904 may receive the same configuration command and perform the same functionality, in some cases test circuitry 904 might not know that processing circuitry 100 is a model of packet switch 902 rather than a packet switch.

Processing circuitry 100 may operate independent of packet switch 902. For example, processing circuitry 100 might not communicate with packet switch 902.

Test circuitry 904 may send an original test packet to packet switch 902 and may send a duplicate of the original test packet to processing circuitry 100. In one embodiment, the original test packet and the duplicate are Ethernet packets. Although the original is sent to packet switch 902, the original need not include any address associated with packet switch 902. For example, neither the Ethernet address nor the IP address of packet switch 902 need be included in the original test packet. Likewise, the duplicate test packet need not include any address associated with processing circuitry 100. However, in some embodiments, the original may include an address (e.g., an Ethernet address or IP address) of packet switch 902 and/or the duplicate test packet may include an address of processing circuitry 100.

Packet switch 902 may modify the original test packet according to functionality of packet switch 902 and may forward the modified original test packet to test circuitry 904. In some cases, packet switch 902 may receive the original test packet on port 906 and may forward the modified original test packet to test circuitry 904 via port 908.

Processing circuitry 100 may receive the duplicate (e.g., on port 102) and may modify the duplicate based on model 802, which is configured to model expected behavior of packet switch 902. Processing circuitry 100 may then forward the modified duplicate packet to test circuitry 904 (e.g., via port 104).

Test circuitry 904 may compare the modified original test packet to the modified duplicate packet to see if there are any differences. In some configurations, test circuitry 904 may be configured to report any differences between the modified duplicate and the modified original. In other words, differences may be reported unless the modified duplicate and the modified original are identical, including addresses such as Ethernet DAs, Ethernet SAs, IP DAs, and IP SAs.

In other configurations, test circuitry 904 may be configured to ignore certain fields of the modified original and the modified duplicate. For example, test circuitry 904 may be configured to ignore time stamps when comparing the modified original and the modified duplicate. Differences in the time stamps might not indicate incorrect operation by packet switch 902 since the time stamp in the modified original may be generated by packet switch 902 and the time stamp in the modified duplicate may be generated by processing circuitry 100 and differences in the clocks of packet switch 902 and processing circuitry 100 may be acceptable.

By way of another example, test circuitry 904 may be configured to ignore bits that are considered payload in relation to an OSI layer-two header of the modified original and the modified duplicate. In this case, the payload may include header bits from higher layers of the OSI model, for example layer-three header bits.

If there are no differences, test circuitry may assume that packet switch 902 is behaving according to model 802. If there are differences, test circuitry 904 may report the differences. In one configuration, test circuitry 904 may report the differences to a user. The differences may indicate that packet switch 902 is not behaving according to expected behavior. Alternatively, the differences may indicate that model 802 is not accurately modeling the expected behavior.

This method of sending test packets to packet switch 902 and processing circuitry 100 and comparing resulting packets may be repeated using a number of different test packets. Thereby, the expected functionality of packet switch 902 may be exercised to determine whether packet switch 902 is truly executing according to the expected functionality.

In some cases, implementing a model of the expected functionality in processing circuitry 100 may be accomplished more quickly than implementing the expected functionality in packet switch 902, primarily because processing circuitry 100 may implement the expected functionality in a software model instead of implementing the expected functionality in specialized hardware and firmware in packet switch 902. Accordingly, as new functionality is developed for packet switch 902, a test engineer may quickly implement a model of the new functionality so that packet switch 902 may be tested against the model to discover defects in packet switch 902 prior to generally releasing packet switch 902.

According to another aspect of the invention, a packet switch test method includes sending an original test packet to a packet switch and sending a duplicate of the original test packet to processing circuitry configured to model expected behavior of the packet switch. The method also includes receiving a first response packet from the packet switch in response to the sending of the original test packet and determining that a second response packet has not been received from the processing circuitry in response to the sending of the duplicate. The method also includes determining that the packet switch is not operating according to the expected behavior based on the receiving of the first response packet and the determining that the second response packet has not been received from the processing circuitry.

The method may further include prior to the sending of the original test packet and the sending of the duplicate, configuring the packet switch with a set of parameters using an application programming interface (API) and configuring the processing circuitry with the set of parameters using the API.

The original test packet may include a layer-two destination address that is not a layer-two destination address of the packet switch and the duplicate may include a layer-two destination address that is not a layer-two destination address of the processing circuitry.

In some cases, test circuitry 904 may send an original test packet to packet switch 902 that is designed so that, according to expected behavior of packet switch 902, packet switch 902 will drop the original test packet rather than forwarding the original test packet or a modified version of the original test packet back to test circuitry 904. Test circuitry 904 may send a duplicate of this specially designed test packet to processing circuitry 100.

Test circuitry 904 may then wait a period of time. If test circuitry 904 does not receive a packet from packet switch 902 in response to the original test packet (e.g., a modified original test packet) and test circuitry 904 does not receive a packet from processing circuitry 100 in response to the duplicate test packet, test circuitry 904 may conclude that packet switch 902 is operating according to expected behavior.

However, if test circuitry 904 does receive a packet from packet switch 902 in response to the original test packet (e.g., a modified original test packet) but does not receive a packet from processing circuitry 100 in response to the duplicate test packet, test circuitry 904 may conclude that packet switch 902 is not operating according to expected behavior.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet data structure formation method comprising:
   receiving a request to create a data structure for representing a packet, the request referring to two or more fields to be included in the packet;
   determining bit values and packet positions associated with the fields;
   based on the determining, creating a first set of bits comprising the packet, the first set of bits comprising the bit values in the packet positions;
   receiving a request to add an additional field to the packet, the request comprising an identifier identifying the additional field and a value in a first format;
   converting the value from the first format to a second format wherein the value, when in the second format, comprises a second set of bits;
   based on the identifier, determining a position within the packet where the second set of bits are to be located;
   modifying the first set of bits to include the second set of bits at the positions; and
   transmitting the modified first set of bits to a device via a network interface.

2. The method of claim 1 wherein the packet comprises at least one field not explicitly referred to by the request comprising a default value.

3. The method of claim 1 wherein the request includes the bit values.

4. The method of claim 1 wherein the two or more fields are arranged in the request in a first order and subsequent to the creating of the set of bits, the two or more fields are arranged in the packet in a second order different from the first order.

5. The method of claim 1 wherein:
   the packet comprises a first packet;
   the request refers to a second packet; and
   subsequent to the creating of the set of bits, the first packet is identical to the second packet except for the two or more fields.

6. The method of claim 1 wherein one of the fields is configured to be used in layer-two forwarding of the packet and another one of the fields is configured to be used in layer-three forwarding of the packet.

7. A packet data structure modification method comprising:
   providing a data structure comprising a first set of bits representing a packet;

receiving a request to modify the data structure, the request comprising an identifier identifying a packet field and a value, the value being in a first format;

converting the value from the first format to a second format wherein the value, when in the second format, comprises a second set of bits;

based on the identifier, determining a position within the packet where the second set of bits are to be located;

modifying the first set of bits to include the second set of bits at the position; and transmitting the modified first set of bits to a device via a network interface.

8. The method of claim 7 wherein the request does not explicitly describe the position.

9. The method of claim 7 wherein the first format is a decimal format and the second format is a binary format.

10. The method of claim 7 wherein prior to the modifying of the first set of bits, the packet does not include the packet field.

11. The method of claim 7 wherein the value comprises a first value and prior to the modifying of the first set of bits the packet includes the packet field, but the packet field comprises a second value different from the first value.

12. The method of claim 7 wherein the data structure comprises an object and the receiving of the request comprises receiving the request as a result of a method of the object being called.

13. The method of claim 7 wherein the modifying of the first set of bits comprises modifying the first set of bits without modifying a layer-two address of the packet.

14. A packet data structure modification method comprising:

providing a data structure comprising a first set of bits representing a packet;

receiving a request to modify the data structure, the request comprising an identifier identifying a packet field;

based on the identifier, identifying a subset of the set of bits that comprise the packet field;

removing the subset from the set of bits;

receiving a request to add an additional field to the packet, the request comprising an additional identifier identifying the additional field and a value in a first format;

converting the value from the first format to a second format wherein the value, when in the second format, comprises a second set of bits;

based on the additional identifier, determining a position within the packet where the second set of bits are to be located;

modifying the first set of bits to include the second set of bits at the position; and transmitting the modified first set of bits to a device via a network interface.

15. The method of claim 14 wherein the packet is an Ethernet packet.

16. The method of claim 14 wherein the subset comprises one or more of at least one Virtual Local Area Network (VLAN) identifier, at least one Multiprotocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

17. The method of claim 14 wherein the subset comprises a first subset and further comprising subsequent to the removing of the subset, concatenating a second subset of the set of bits with a third subset of the set of bits, wherein prior to the removing of the first subset, the second subset is positioned within the packet so as to be ahead of the first subset with respect to a transmission order of the bits and the third subset is positioned within the packet behind the first subset with respect to the transmission order.

18. An article of manufacture comprising:

processing circuitry configured to:

access a first set of bits of a packet;

determine two or more fields are present within the set of bits;

based on the determining, partition the set of bits into two or more subsets of the set of bits, the two or more subsets corresponding to the two or more fields;

associate identifiers with the two or more fields, the two or more fields being associated with different identifiers relative to one another;

create a data structure configured to allow the two or more subsets corresponding to the two or more fields to be individually modified by referring to the identifiers associated with the fields;

receive a request to add an additional field to the packet, the request comprising an additional identifier identifying the additional field and a value in a first format;

convert the value from the first format to a second format wherein the value, when in the second format, comprises a second set of bits;

based on the additional identifier, determine a position within the packet where the second set of bits are to be located;

modify the first set of bits to include the second set of bits at the position; and transmit the modified first set of bits to a device via a network interface.

19. The article of manufacture of claim 18 wherein the identifiers are not present in the set of bits.

20. The article of manufacture of claim 18 wherein the data structure comprises an object having methods configured to allow the two or more subsets corresponding to the two or more fields to be individually modified by referring to the identifiers associated with the two or more fields.

21. The article of manufacture of claim 18 wherein one of the two or more fields comprises a layer-two destination address, a layer-two source address, a layer-three destination address, a layer-three source address, a time-to-live value, a Virtual Local Area Network (VLAN) identifier, a Multiprotocol Label Switching (MPLS) label, a Provider Bridging (PB) identifier, a Provider Backbone Bridging (PBB) identifier, a Provider Backbone Transport (PBT) identifier, Provider Backbone Bridging Traffic Engineering (PBB-TE) identifier, or a Virtual Private LAN Services (VPLS) identifier.

22. The article of manufacture of claim 18 wherein the determining that two or more fields are present comprises identifying bit patterns associated with network protocols.

23. The article of manufacture of claim 18 wherein some of the bits of one of the two or more subsets also belong to another one of the two or more subsets.

24. The article of manufacture of claim 18 wherein the computer program code is further configured to receive a request to display one of the two or more fields and in response display the one field in a decimal format.

25. A packet data structure comparison method comprising:

accessing a first packet data structure comprising a first set of bits and a second packet data structure comprising a second set of bits;

comparing the first set of bits to the second set of bits;

based on the comparing, identifying at least one third set of bits present in the first set of bits but not present in the second set of bits;

determining that the third set of bits comprises a field of the first packet that is either not present in the second packet or that is present in the second packet but has a value in the first packet that is different than a value of the field in the second packet;

based on the determining, communicating a difference between the first packet and the second packet using an identifier of the field;

receiving a request to add an additional field to one or more of the first packet and the second packet, the request comprising an additional identifier identifying the additional field and a value in a first format;

converting the value from the first format to a second format wherein the value, when in the second format, comprises an additional set of bits;

based on the additional identifier, determining a position within the corresponding packet where the additional set of bits are to be located;

modifying the corresponding set of bits to include the additional set of bits at the position; and testing a packet switch using the first packet and the second packet.

26. The method of claim 25 wherein the third set of bits comprise the value of the field of the first packet in a binary format and further comprising converting the value of the field of the first packet to a decimal format and wherein the communicating of the difference further comprises communicating the difference using the converted value.

27. The method of claim 25 wherein the name is descriptive of the field.

* * * * *